United States Patent
Clougherty

(10) Patent No.: US 9,850,021 B2
(45) Date of Patent: Dec. 26, 2017

(54) PAPER-BASED COMPOSITE CONTAINER FOR OFF-GASSING PRODUCTS, AND METHOD FOR MAKING SAME

(75) Inventor: Kenan J. Clougherty, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 1116 days.

(21) Appl. No.: 13/071,721

(22) Filed: Mar. 25, 2011

(65) Prior Publication Data
US 2012/0241510 A1  Sep. 27, 2012

(51) Int. Cl.
*B65D 5/12* (2006.01)
*B31B 49/02* (2006.01)
(Continued)

(52) U.S. Cl.
CPC .......... *B65D 3/04* (2013.01); *B65D 3/12* (2013.01); *B65D 3/266* (2013.01); *B31B 50/0044* (2017.08); *B31B 50/0045* (2017.08); *B31B 50/44* (2017.08); *B31B 50/81* (2017.08); *B31B 50/814* (2017.08); *B31B 50/84* (2017.08); *B31B 2105/00* (2017.08); *B31B 2105/001* (2017.08); *B31B 2110/20* (2017.08);
(Continued)

(58) Field of Classification Search
CPC ...... B65D 2543/00092; B65D 2205/00; B65D 2251/0093; B65D 51/20; B65D 3/12; B65D 51/1672; B65B 7/2878; B65B 7/164; B65B 7/2892
USPC ......... 229/202, 87.18, 201, 125.05; 220/785, 220/787, 799, 495.04, 309.2; 206/830
See application file for complete search history.

(56) References Cited

U.S. PATENT DOCUMENTS 1,035,305 A    8/1912  Beadle
2,402,943 A    7/1946  Bogoslowsky
(Continued)

FOREIGN PATENT DOCUMENTS

EP       0 561 487 A1     9/1993
EP       1 870 340 A1    12/2007
WO    WO 2008/141267 A1  11/2008

OTHER PUBLICATIONS

International Search Report and Written Opinion for Application No. PCT/US2012/030097 dated Jun. 12, 2012.

*Primary Examiner* — Christopher Demeree
(74) *Attorney, Agent, or Firm* — Nelso Mullins Riley & Scarborough, LLP

(57) ABSTRACT

A substantially paper-based composite container for an off-gassing product includes a paperboard can body having a substantially gas-impervious liner attached to an inner surface thereof, and a pair of substantially paper-based end closures attached to the opposite ends of the can body, each end closure defining a generally cylindrical sealing panel in contact with an inner surface of the can body. Heat-sealable materials are disposed on opposing surfaces of the sealing panel and can body. The sealing panels of the end closures are attached to the can body by heat seals. The heat seal for at least one of the end closures is discontinuous such that at least one vent channel extends through the heat seal so as to establish fluid communication between an interior of the composite container and the environment outside the composite container. The at least one vent channel is operable to vent excess gas pressure from the interior of the container.

4 Claims, 9 Drawing Sheets

(51) Int. Cl.
  *B65D 3/04* (2006.01)
  *B65D 3/12* (2006.01)
  *B65D 3/26* (2006.01)
  *B65D 85/36* (2006.01)
  *B31B 50/44* (2017.01)
  *B31B 50/84* (2017.01)
  *B31B 50/81* (2017.01)
  *B31B 105/00* (2017.01)
  *B31B 50/00* (2017.01)
  *B31B 120/10* (2017.01)
  *B31B 110/20* (2017.01)
  *B31B 120/00* (2017.01)

(52) U.S. Cl.
  CPC ..... *B31B 2120/002* (2017.08); *B31B 2120/10* (2017.08); *B65D 85/36* (2013.01); *B65D 2205/00* (2013.01)

(56) References Cited

U.S. PATENT DOCUMENTS

| | | | |
|---|---|---|---|
| 2,413,449 A | 12/1946 | Hatch | |
| 2,819,006 A | 1/1958 | Magill et al. | |
| 4,261,502 A | 4/1981 | Ohmori | |
| 4,338,765 A | 7/1982 | Ohmori et al. | |
| 4,459,793 A * | 7/1984 | Zenger | 53/434 |
| 4,557,414 A * | 12/1985 | Ford et al. | 229/5.5 |
| 4,599,123 A | 7/1986 | Christensson | |
| 4,692,132 A | 9/1987 | Ikushima et al. | |
| 5,562,230 A | 10/1996 | Perry | |
| 5,692,638 A * | 12/1997 | Perry | 220/624 |
| 5,913,798 A | 6/1999 | Grabher | |
| 6,003,759 A * | 12/1999 | Kenner et al. | 229/104 |
| 6,176,070 B1 | 1/2001 | Grabher | |
| 6,558,305 B1 | 5/2003 | Häggman | |
| 7,337,916 B2 * | 3/2008 | Clougherty | 220/785 |

* cited by examiner

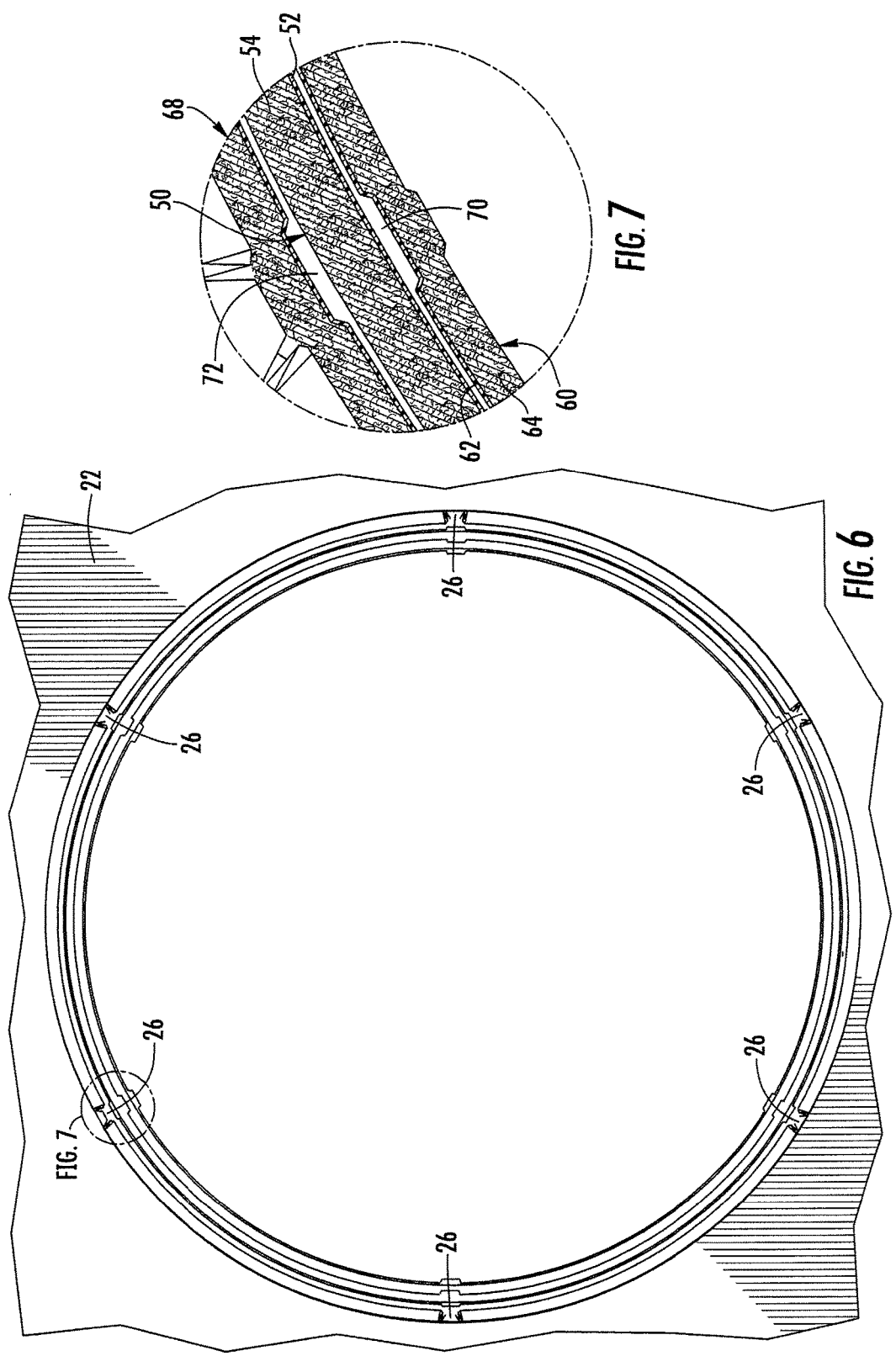

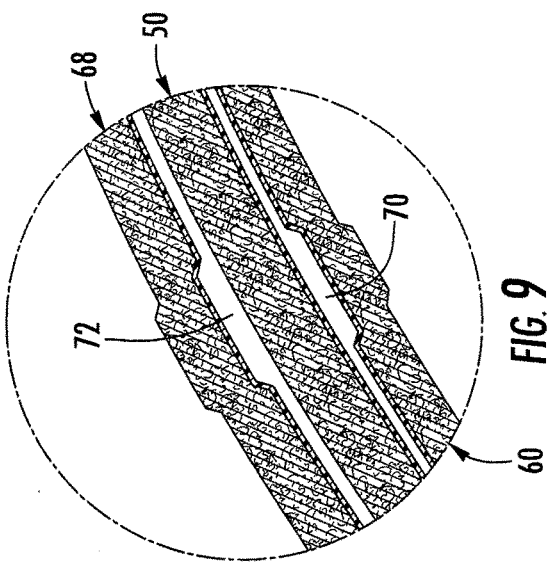
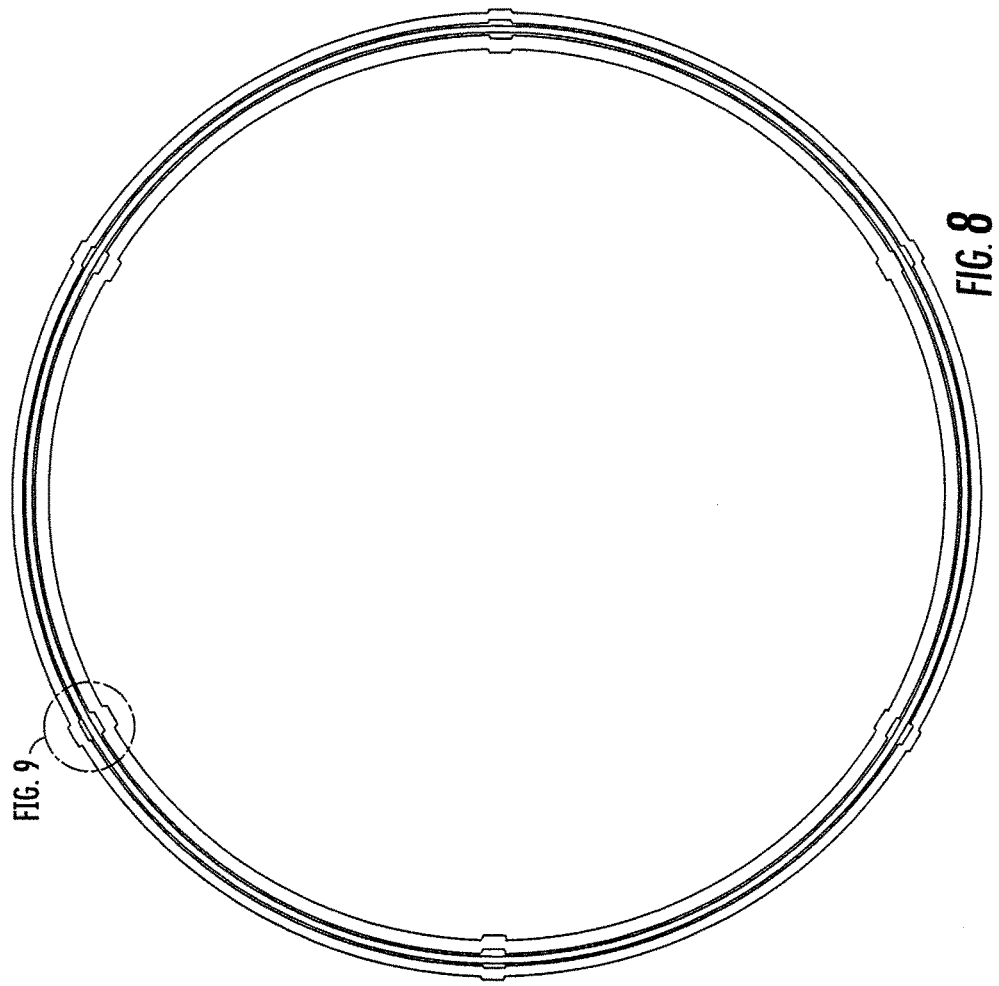

PAPER-BASED COMPOSITE CONTAINER FOR OFF-GASSING PRODUCTS, AND METHOD FOR MAKING SAME

BACKGROUND OF THE INVENTION

The present disclosure relates generally to containers for products, and more particularly relates to paper-based composite containers for off-gassing products.

Paper-based composite containers for off-gassing products (e.g., refrigerated dough) have been in the marketplace for many years. A typical dough can has a can body formed of a paperboard body ply wrapped helically about an axis such that a butt joint is defined between the adjacent edges of successive helical turns of the body ply. An impervious liner is attached to the inner surface of the body ply, and a peelable label is attached to the outer surface of the body ply. The label holds the butt joint closed until the consumer is ready to open the container. The ends of the can body are closed by metal end closures that are seamed onto the ends of the can body. To open the container, the label is peeled off to expose the butt joint. Often, the pressure of the expanded dough in the container is sufficient to open the butt joint once the label is removed. Otherwise, the butt joint is pressed or rapped against an edge of a countertop to cause it to open. The dough product is removed through the opening created by the separated butt joint.

Paper-based composite containers for other off-gassing products (e.g., roasted coffee) may also be desirable as alternatives to metal-based and plastic-based containers.

Generally, containers for off-gassing products require some type of provision for dealing with the pressure increase that occurs in the container when the products give off gases. Various approaches to this problem have been tried. Some containers include vents to vent the excess gases to the outside of the container, so that the container will not become bulged or distorted by the internal gas pressure. Other containers are designed to have portions that can expand outwardly to reduce the internal pressure, but in a manner that is not aesthetically displeasing.

Heretofore, commercial composite dough containers have employed the venting approach. In some cases, the metal end closures have been seamed onto the can body in such a way that a vent passage is defined between the end closures and the can body.

BRIEF SUMMARY OF THE DISCLOSURE

The present disclosure relates to paper-based composite containers for off-gassing products, in which the end closures are not metal but rather are paper-based. Paper-based end closures are not readily attachable to the can body by the seaming technique used with metal end closures, and hence a new approach to their attachment had to be developed. The attachment technique described herein allows secure attachment of the end closures in a hermetic fashion, while also providing a venting function.

In one embodiment described herein, a substantially paper-based composite container for an off-gassing product comprises: a can body comprising a tubular wall constructed from paperboard wrapped about an axis, the can body having opposite ends each defining an opening, the can body further comprising a substantially gas-impervious liner attached to an inner surface of the paperboard of the can body; and a pair of substantially paper-based end closures attached to the opposite ends of the can body, each end closure defining a generally cylindrical sealing panel in contact with a surface of the can body, a heat seal material being disposed on a surface of the sealing panel and a heat seal material being disposed on the surface of the can body contacted by the sealing panel.

The sealing panels of the end closures are attached to the can body by heat seals. The heat seal for at least one of the end closures is discontinuous such that at least one vent channel extends through the heat seal so as to establish fluid communication between an interior of the composite container and the environment outside the composite container. The at least one vent channel is operable to vent excess gas pressure from the interior of the container.

In embodiments described herein, the heat seal having the at least one vent channel is formed by a plurality of separate, spaced heat seal regions where the heat seal materials on the sealing panel and can body have been heat sealed together, thereby forming the at least one vent channel between the spaced heat seal regions.

The spaced heat seal regions can be spaced apart in a circumferential direction about the can body, the at least one vent channel extending generally axially of the can body.

There can be a plurality of vent channels circumferentially spaced apart.

In a specific embodiment suitable for dough containers, the paperboard of the can body is wrapped helically about the axis and a helically extending butt joint is defined in the can body between adjacent edges of successive helical turns of the paperboard. The container includes a label secured about an outer surface of the paperboard of the can body, the label comprising a polymer film. The label is scored to define a helically extending peel strip that is located over the helically extending butt joint. The peel strip is removable from the can body to expose the butt joint while leaving the remainder of the label on the can body.

In embodiments described herein, the end closures comprise a paperboard layer and a barrier layer. The barrier layer can comprise at least one of polymer film and metal foil.

The present disclosure also describes a method for assembling a composite container for an off-gassing product. In one embodiment, the method comprises the steps of providing a can body and a pair of substantially paper-based end closures of the type described above, and positioning the end closures over the openings at the ends of the can body and attaching the sealing panels of the end closures to the can body by forming heat seals therebetween. The heat seal for at least one of the end closures is formed to be discontinuous such that at least one vent channel extends through the heat seal so as to establish fluid communication between an interior of the composite container and the environment outside the composite container, the at least one vent channel being operable to vent excess gas pressure from the interior of the container.

In one embodiment, the heat seal having the at least one vent channel is formed by a plurality of separate, spaced sealing elements that are heated so as to heat and soften the heat seal materials on the sealing panel and can body at a plurality of separate, spaced regions, thereby forming the at least one vent channel between the spaced regions.

The sealing elements can be part of an expandable chuck. In this case, the heat seal can be formed by the steps of: placing the chuck in an unexpanded condition within the opening at the respective end of the can body, the sealing panel of the end closure being located between the tubular wall of the can body and the chuck; disposing a support ring about the end of the can body, such that the tubular wall of the can body and the sealing panel of the end closure are disposed between the support ring and the chuck; and heating the sealing elements of the chuck and expanding the chuck by moving the sealing elements radially outwardly to compress the sealing panel and tubular wall of the can body between the sealing elements and the support ring, the heated sealing elements causing the heat seal materials on the sealing panel and can body to be softened and to seal together at the spaced regions.

In embodiments described herein, between two and ten sealing elements are moved radially outwardly to compress the sealing panel and tubular wall of the can body between the sealing elements and the support ring, thereby forming the heat seal to have between two and ten spaced regions. More preferably, there are between four and eight sealing elements.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 6 is a cross-sectional view along line 6-6 in FIG. 4;

FIG. 7 is a highly magnified detail view of a portion of FIG. 6 as indicated;

FIG. 8 is a cross-sectional view through the can body and end closure of the completed container after the end closure has been heat-sealed to the can body; and FIG. 9 is a highly magnified detail view of a portion of FIG. 8 as indicated.

DETAILED DESCRIPTION OF THE INVENTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
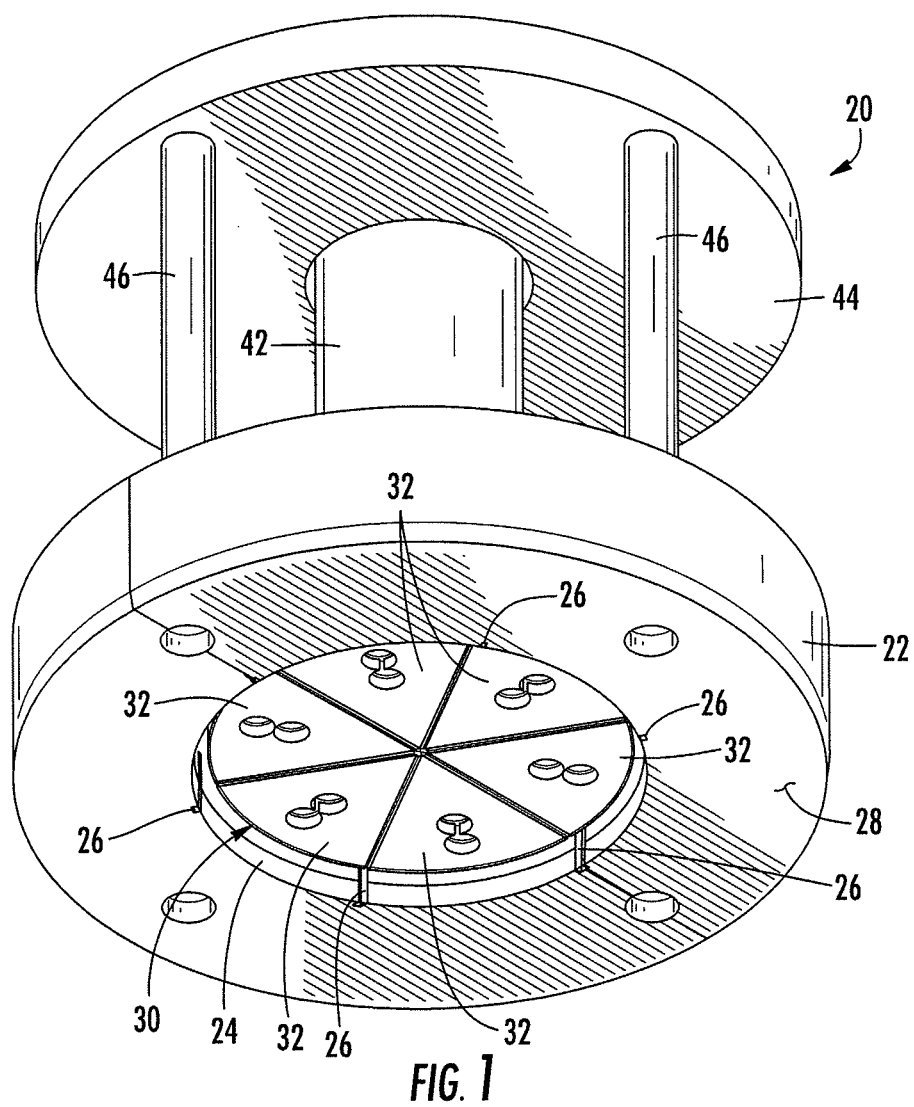
FIG. 1 is a perspective view of a heat-sealing tool, generally from below, for heat-sealing a substantially paper-based end closure to a paperboard can body in accordance with one embodiment of the present invention.
Figure 1A:
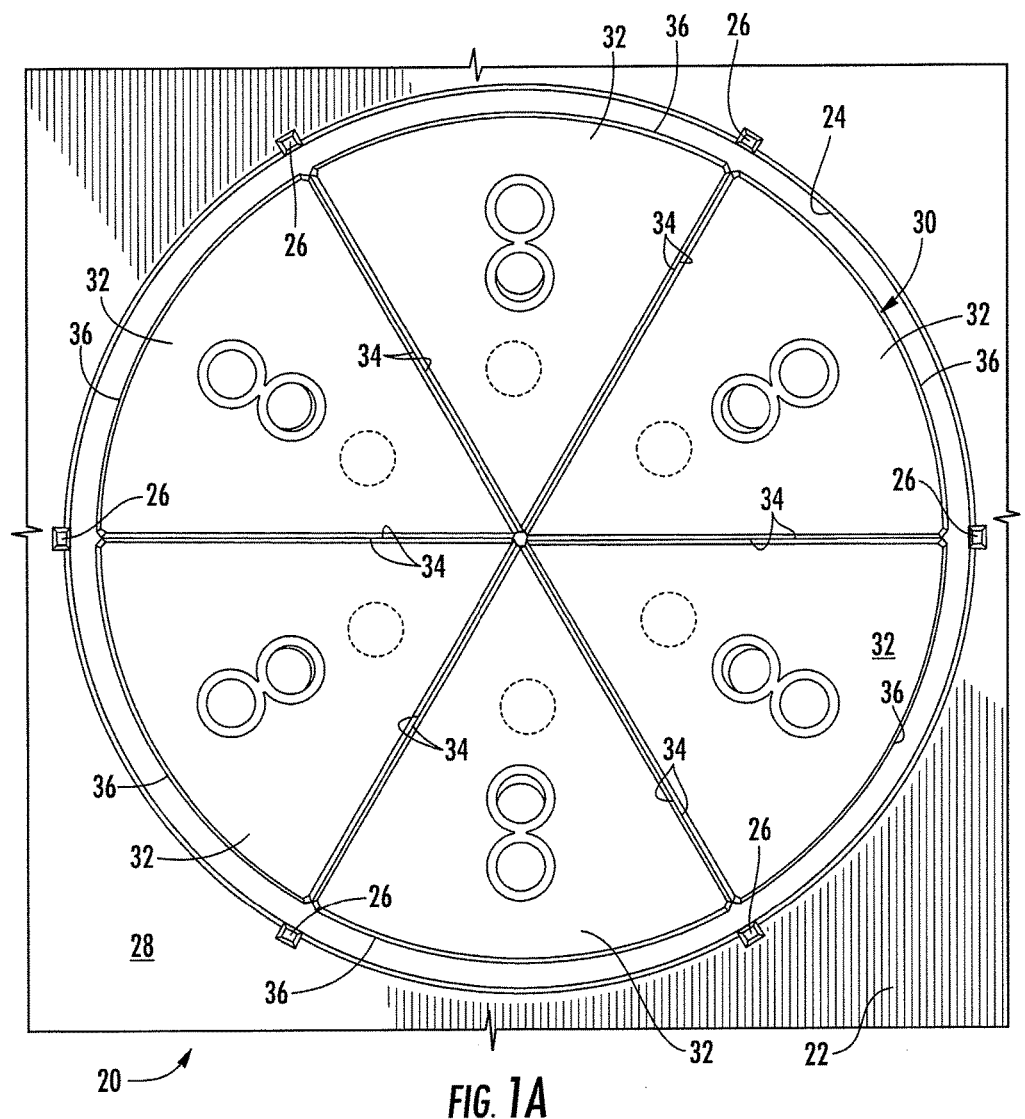
FIG. 1A is an end view of the heat-sealing tool of FIG. 1, from below, showing the sealing chuck of the tool in a retracted (unexpanded) condition.
Figure 1B:
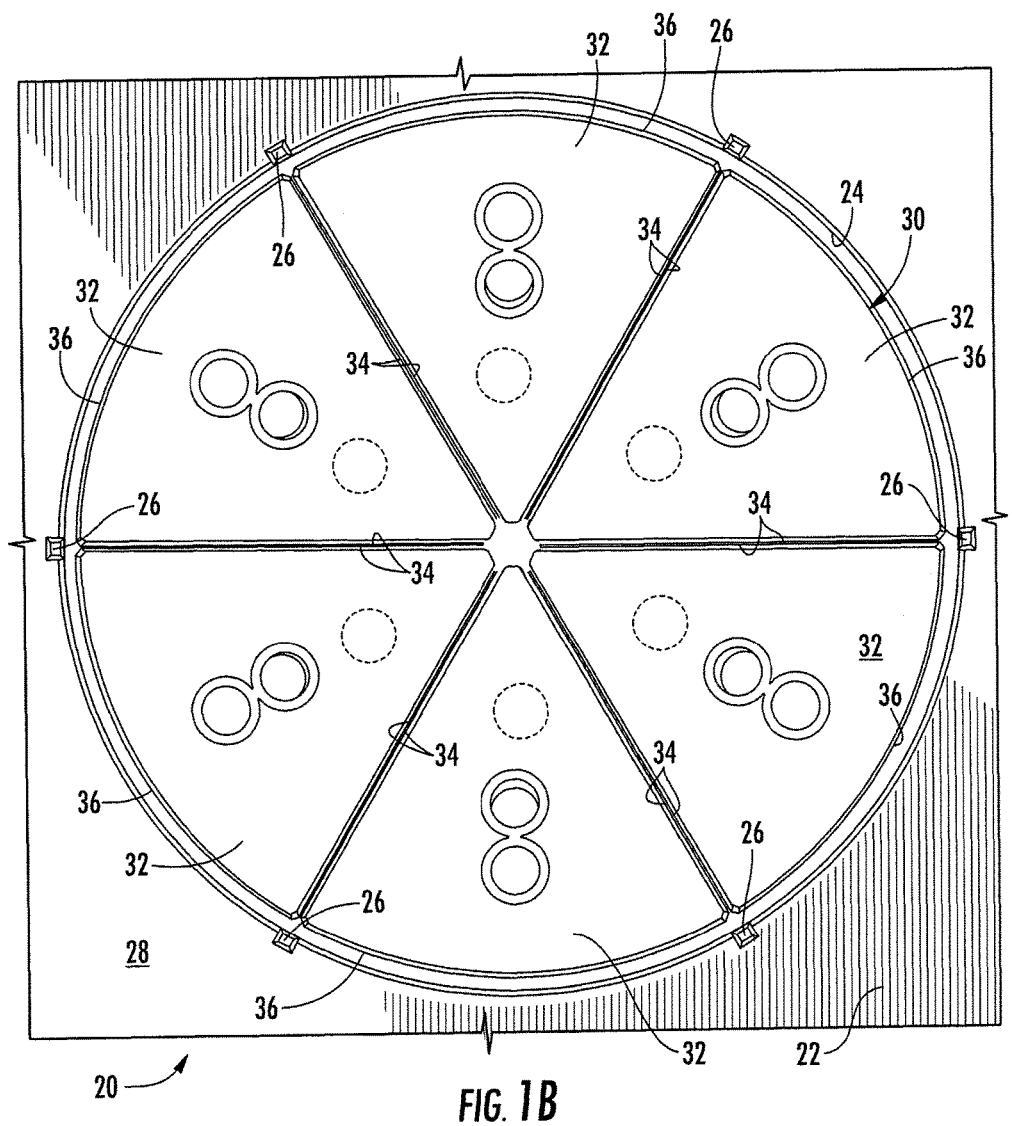
FIG. 1B is an end view of the heating-sealing tool, from below, showing the sealing chuck in an extended (expanded) condition.

FIGS. 1, 1A, and 1B depict a heat-sealing tool 20 for use in heating sealing a substantially paper-based end closure to a paperboard can body in accordance with the present invention. The tool 20 includes an outer support ring 22 defining a central opening whose diameter is approximately equal to (or very slightly less than) the sum of the diameter of the paperboard can body and twice the thickness of the end closure, for reasons that will be made apparent below. The inner surface 24 of the support ring defines six longitudinally extending grooves 26 spaced uniformly about the circumference of the inner surface 24. The inner surface 24 also has a conical or flared portion 24a (FIG. 3) adjacent the lower end face 28 of the support ring 22 to help guide the can body and end closure into the central opening of the support ring during a heat-sealing operation, as further described below.

The heat-sealing tool 20 further includes an expandable and contractible sealing chuck 30 that consists of six wedge-shaped segments 32 each forming one-sixth)(60° of a 360° disk, such that the six segments 32 collectively form the 360° disk. Each segment 32 has two radially extending side edges 34 that are linear and a radially outer edge 36 that is part-cylindrical (i.e., one-sixth, or 60°, of a cylinder). The segments 32 are sized in outside diameter such that when the segments have their adjacent side edges 34 abutting each other (as in FIG. 1A), the radially outer edges 36 of the segments define a substantially cylindrical surface having an outside diameter that is slightly smaller than the inside diameter of a paperboard can body to be processed by the heat-sealing tool.

The tool 20 includes an arrangement for moving the segments 32 radially outwardly in unison so as to increase the outside diameter of the substantially cylindrical surface that the segments collectively form. In the illustrated tool 20, this arrangement comprises a longitudinally movable ram 40 connected at its lower end to a cam arrangement (not visible in the drawings) that engages cam surfaces on the segments 32. The ram 40 passes down the center of a hollow guide tube 42 affixed at its lower end to the support ring 22. Moving the ram 40 downward relative to the segments 32 causes the cam arrangement to urge the segments 32 radially outwardly. The tool 20 also includes an upper plate 44 rigidly connected by connecting members 46 to the support ring 22, and has means (not shown) for urging the upper plate 44, and therefore the support ring 22, downward independently of the movement of the ram 40, for reasons that will be made apparent below.

Figure 2:
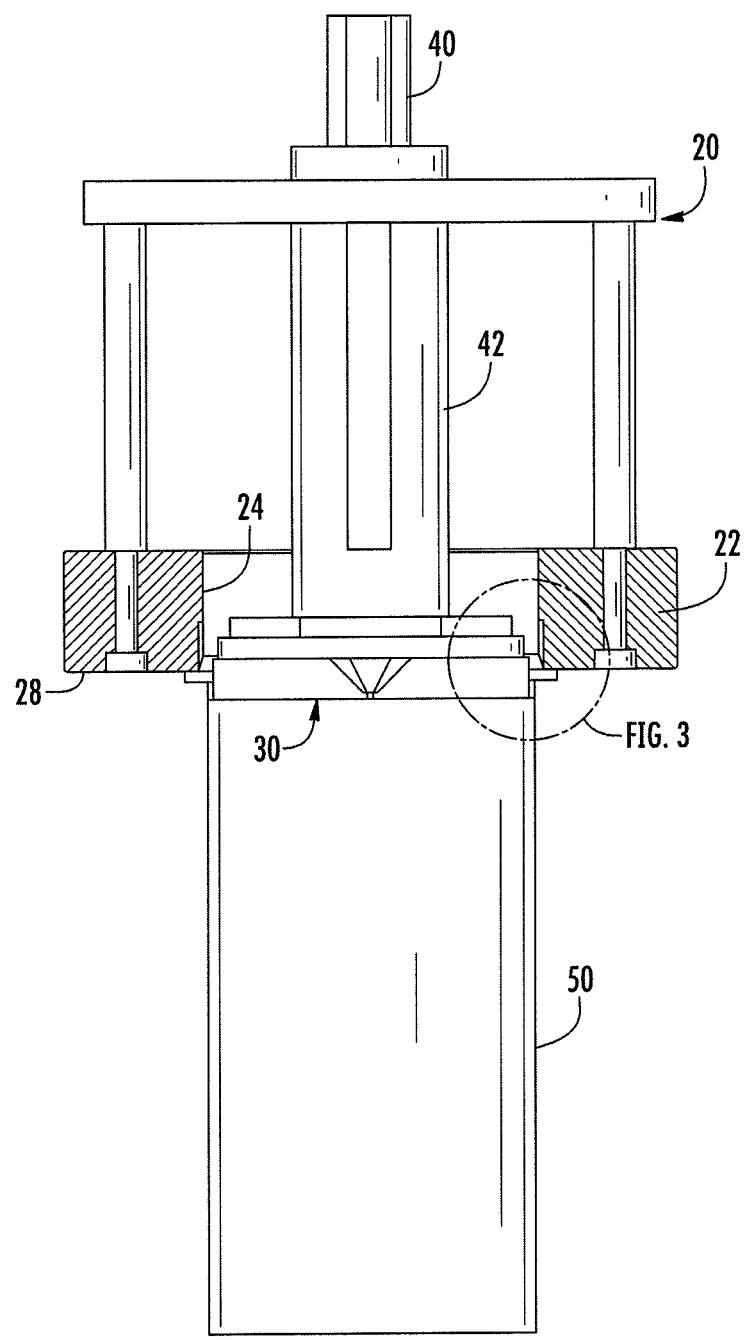
FIG. 2 is a side view of the heat-sealing tool positioned above an assembly of a paperboard can body and substantially paper-based end closure, in preparation for heat-sealing the end closure to the can body.
Figure 3:
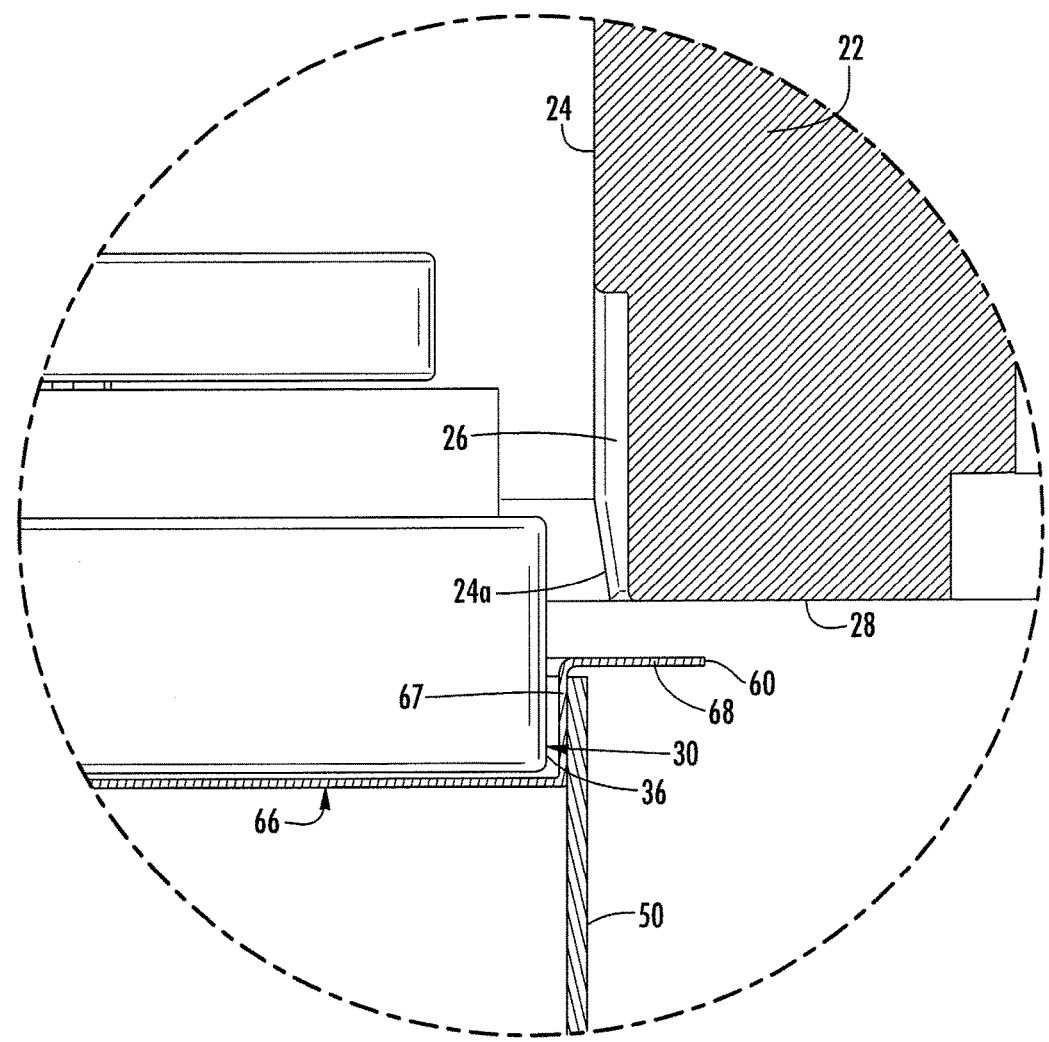
FIG. 3 is a highly magnified detail view of a portion of FIG. 2 as indicated.

Turning to FIGS. 2 through 5, a heat-sealing operation employing the tool 20 is now described. FIGS. 2 and 3 depict the tool 20 positioned atop an assembly consisting of a paperboard can body 50 and a substantially paper-based end closure 60. The can body 50 has a cylindrical or tubular form and is open at both ends. The can body 50 is formed substantially of paperboard and includes a heat-sealable material on its inner surface. The heat-sealable material can be part of a gas-impervious liner 52 attached to an inner surface of a tubular wall 54 (FIG. 7) constructed from paperboard wrapped helically or convolutely about an axis of the tube. The end closure 60 can comprise a laminate of multiple layers, including a heat-sealable layer 62 and a paper layer 64 (FIG. 7). The end closure 60 is formed (preferably prior to placing it atop the can body 50) so that it has a disk-shaped central portion 66, a cylindrical sealing panel 67 that extends upwardly from the central portion and is sized to fit closely into the top end of the can body 50, and an outer peripheral portion 68 that extends radially outwardly from the top end of the sealing panel 67 for a distance sufficient to provide enough material to be wiped down the outer surface of the top end of the can body 50.

As shown in FIG. 3, the heat-sealing tool 20 initially is in a starting position in which the sealing chuck 30 is in its retracted (contracted) state and has its lower surface closely adjacent or abutting the top surface of the central portion 66 of the end closure. The tool 20 as a whole can be lowered, or the can body 50 and end closure 60 assembly can be raised relative to the tool 20, to cause the contracted sealing chuck 30 to push the central portion 66 of the end closure down into the top end of the can body 50 until the outer peripheral portion 68 is abutting or nearly abutting the top edge of the can body 50. In this condition, the support ring 22 of the tool 20 is in a raised position slightly spaced above the top edge of the can body 50 and the outer peripheral portion 68 of the end closure 60 as shown in FIG. 3.

Figure 4:
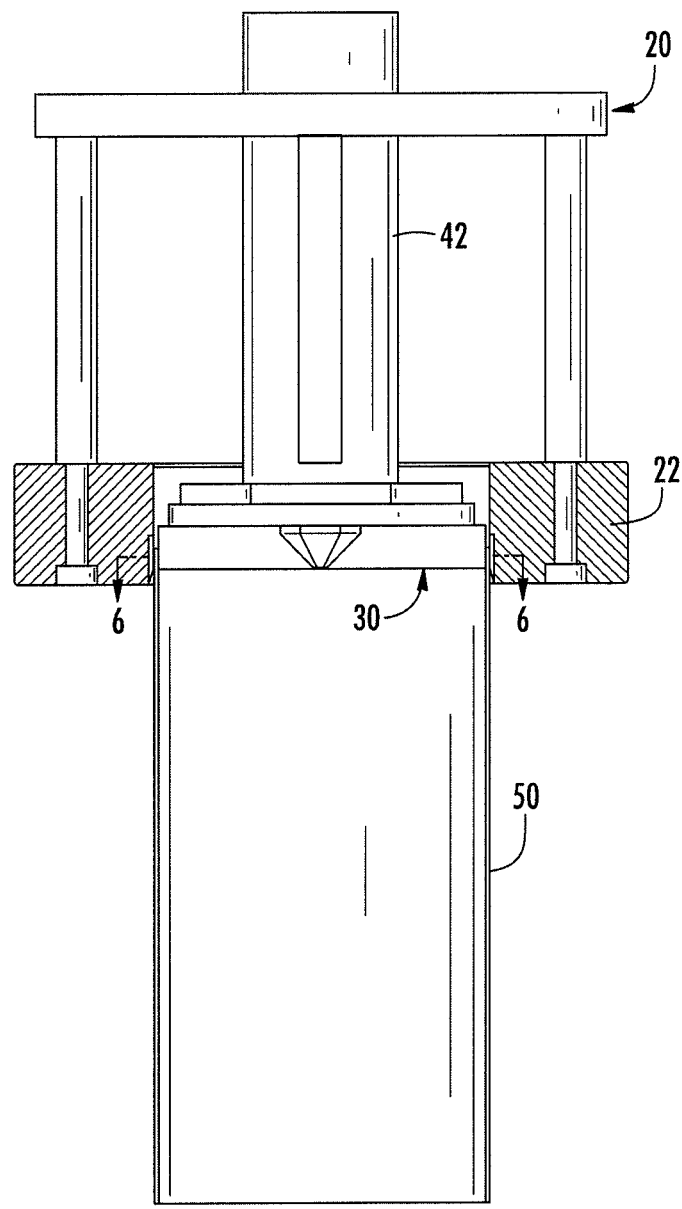
FIG. 4 is a side view of the heat-sealing tool and the can body/end closure assembly, after the heat-sealing tool has been lowered into engagement with the can body/end closure assembly and the sealing chuck has been extended to expand the chuck and heat-seal the end closure to the can body.
Figure 5:
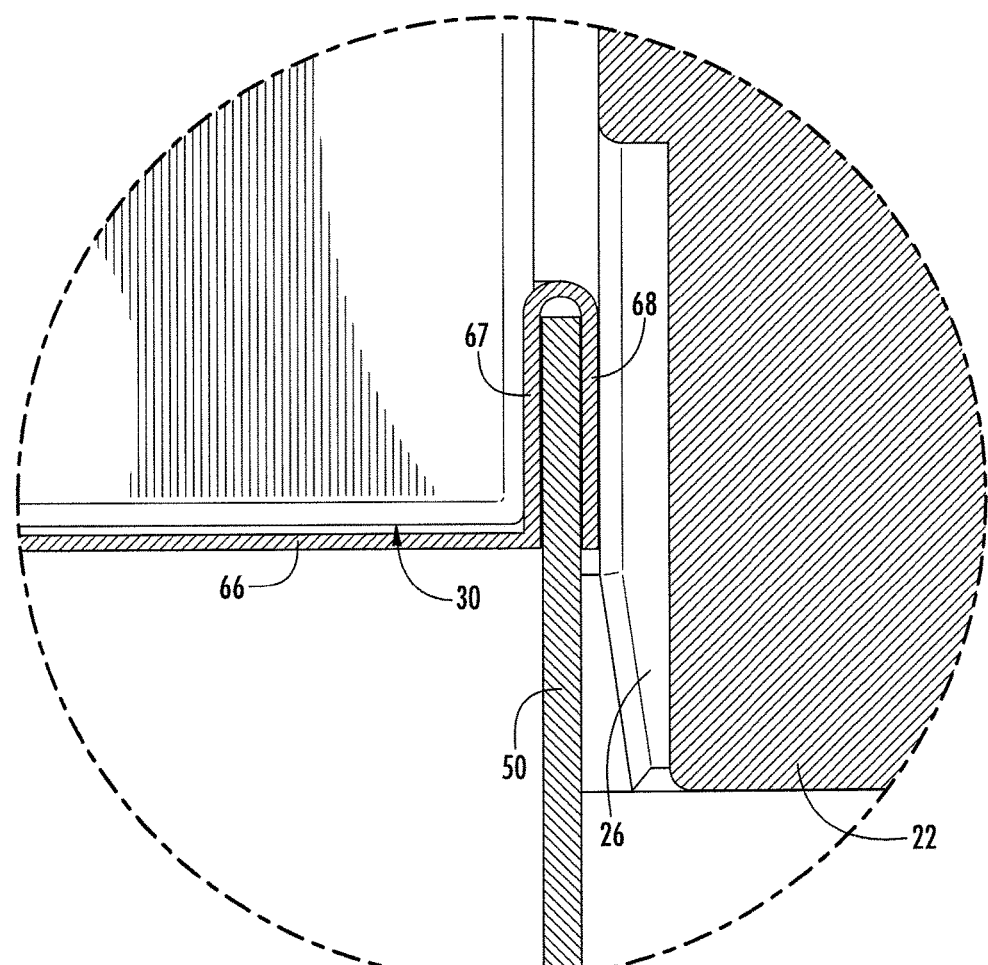
FIG. 5 is a highly magnified detail view to illustrate the engagement of the can body and end closure between the expanded sealing chuck and the outer support ring of the heat-sealing tool.

FIGS. 4 and 5 illustrate the next step of the heat-sealing operation. The support ring 22 is moved downward so that the upper end of the can body 50 is received inside the central opening of the support ring, in the radial space between the inner surface 24 of the support ring and the outer surface of the sealing chuck 30. Substantially concurrently, the ram 40 is moved downward to cause the sealing chuck 30 to be expanded in diameter so that the end closure's sealing panel 67, the can body 50, and the outer peripheral portion 68 of the end closure are radially compressed between the expanded chuck 30 and the support ring 22. The sealing chuck 30 and the support ring 22 are heated sufficiently to cause softening or melting of the heat-sealable materials on the can body 50 and end closure 60. Specifically, with reference to FIG. 7, the heat-sealable layer 52 on the can body and the heat-sealable layer 62 on the end closure 60 are softened or melted and fuse together (note: layers 52 and 62 are shown with spacing between them in FIG. 7, for clarity of illustration; in reality they are in contact with each other). The heating is then discontinued and the support ring 22 and ram 40 are retracted and the finished can/end closure assembly is removed from the tool 20 to complete the heat-sealing operation. An end closure can be attached to the opposite end of the can body in the same fashion as just described.

The tool 20 produces unique features in the completed can/end closure assembly, which are now described with reference to FIGS. 6 through 9. In particular, because there are circumferential gaps between adjacent segments 32 of the expanded sealing chuck (as best seen in FIG. 1B), the heated segments 32 produce spaced heat seal regions where the heat seal materials on the sealing panel 67 and can body 50 have been heat sealed together. The spaces between those heat seal regions are areas where the sealing panel 67 of the end closure is not heat-sealed to the can body 50, since the heat-sealable layers 52, 62 of these components are not heated and fused together in these areas. The result, as seen in FIGS. 7 and 9, is a series of channels 70 between the sealing panel 67 and the can body 50. These channels 70 act as vents that can allow excess gas pressure inside the container to be vented to the outside of the container. It should be noted that FIGS. 7 and 9 depict the channels 70 as being open radial spaces, but this is mainly for clarity of illustration. In reality, the sealing panel 67 and can body 50 may contact each other in the region of the channels 70, but are not sealed or otherwise attached together in the channels 70, which is what allows excess gas pressure to escape through the channels.

This venting action is also aided by similar channels 72 defined between the outer peripheral portion 68 of the end closure and the outer surface of the can body 50. The channels 72 are formed as a result of the grooves 26 in the inner surface of the support ring 22, which are aligned with the gaps between sealing chuck segments 32 and allow the outer peripheral portion 68 of the end closure in the regions of the grooves to "flow" outwardly into the grooves. The channels 70 on the inner side of the can body can communicate with the channels 72 on the outer side because the end closure is not sealed to the very top edge of the can body, as best seen in FIG. 5.

A container assembled in accordance with the foregoing description can be used for containing a product that off-gases or causes increasing pressure within the container, such as refrigerated dough or roasted coffee. Excess pressure in the container is vented through the channels. The threshold pressure at which venting will occur can be controlled by suitably designing the number and sizes of the gaps between sealing chuck segments 32 and correspondingly the number and sizes of the grooves 26 in the support ring 22, thereby controlling the number and dimensions of the channels 70, 72.

As one non-limiting example, the sealing panel 67 can have a thickness of about 0.015" to about 0.020", and a circumference of about 9.5". The collective circumferential width of the channels 70 (i.e., the sum of the circumferential widths of all channels) can be about 0.095" to about 1.5", or on a percentage basis, about 1% to about 16% of the circumference of the sealing panel. The collective circumferential width more preferably ranges from about 2% to about 10%, and still more preferably about 4% to about 6% of the circumference. As one example, there can be six channels 70 each 0.060" in circumferential width, for a collective circumferential width of 0.36", or 3.8% of the circumference. It will be understood that the circumferential widths of the channels 70 correspond to the circumferential widths of the gaps between sealing segments 32 at the radially outer surface 36 of the sealing chuck 30, and the circumference of the sealing panel 67 is substantially equal to the circumference of the outer surface 36 of the sealing chuck 30. Thus, another way of specifying the preferred channel/gap widths is to require that the collective circumferential width of the gaps between segments 32 at the radially outer surface 36 of the sealing chuck 30 ranges from about 1% to about 16% (more preferably about 2% to about 10%, and still more preferably about 4% to about 6%) of the circumference of the outer surface 36.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A substantially paper-based composite container for an off-gassing product, comprising:
    a can body comprising a tubular wall constructed from paperboard wrapped about an axis, the can body having opposite ends each defining an opening, the can body further comprising a substantially gas-impervious liner attached to an inner surface of the paperboard of the can body; and a pair of substantially paper-based end closures attached to the opposite ends of the can body, each end closure defining a cylindrical sealing panel in contact with a surface of the can body, a heat seal material being disposed on a surface of the sealing panel and a heat seal material being disposed on the surface of the can body contacted by the sealing panel;

the sealing panels of the end closures being attached to the can body by heat seals;

the heat seal for at least one of the end closures being formed as a plurality of separate, spaced heat seal regions between the sealing panel and can body, and there being an unsealed region between each pair of adjacent spaced heat seal regions in which there is heat seal material on the sealing panel and on the surface of the can body contacted by the sealing panel but in which said heat seal materials are not sealed together such that each unsealed region constitutes a vent channel between the sealing panel and the can body so as to establish fluid communication between an interior of the composite container and the environment outside the composite container, the vent channel(s) being operable to vent excess gas pressure from the interior of the container.

2. The substantially paper-based composite container of claim 1, wherein the spaced heat seal regions are spaced apart in a circumferential direction about the can body, the vent channel(s) extending generally axially of the can body.

3. The substantially paper-based composite container of claim 2, wherein there are a plurality of vent channels circumferentially spaced apart.

4. The substantially paper-based composite container of claim 1, wherein the end closures comprise a paperboard layer and a heat-sealable layer providing the heat seal material.

\* \* \* \* \*